United States Patent Office 3,560,385
Patented Feb. 2, 1971

3,560,385
METHOD OF LUBRICATING SILICEOUS MATERIALS
Charles A. Roth, Saginaw, Mich., assignor to Dow Corning Corporation, Midland, Mich.
No Drawing. Filed Nov. 1, 1968, Ser. No. 772,851
Int. Cl. C10m 1/50
U.S. Cl. 252—49.6                7 Claims

ABSTRACT OF THE DISCLOSURE

An organosilicon quaternary ammonium compound, such as

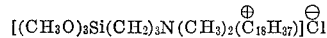

is applied to the surfaces of solid siliceous material, for example, glass fibers, as a lubricant.

---

This invention relates to the lubrication of siliceous materials. In one aspect the invention relates to a method of lubricating glass and ceramic articles so as to prevent scratching, scuffing and chipping of the article. In another aspect the invention relates to the lubrication of glass fibers to prevent breakage of the fibers through abrasion.

Siliceous materials, in the form of glass, porcelain, glass-ceramic articles, have become commercially important. For example, glass fibers and cloth are used to reinforce a variety of plastics. Glass-ceramic cookware and dishes have gained wide acceptance. These siliceous materials are often subjected to harsh conditions of usage, whereby they are abraded, scuffed, scratched and chipped. For example, the dishes used by large institutions, such as hospitals, are washed, stacked, and handled several times daily. Through the practice of the invention, wherein the siliceous material is provided with a lubricant coating, the service life of glass and glass-ceramic articles is greatly increased.

Thus, it is an object of the invention to provide a method of lubricating the surfaces of siliceous materials.

Another object of the invention is to prolong the service life of glass and glass-ceramic articles.

Another object of the invention is to improve the handling properties of glass fibers.

According to the invention, there is provided a method of lubricating the surfaces of solid siliceous materials comprising applying to the surface an organosilicon quaternary ammonium compound of the general formula

X is the hydroxyl group or a hydrolyzable radical;
R is a lower alkyl radical;
R' is a divalent hydrocarbon radical of from 3 to 18 carbon atoms or a divalent hydrocarbon radical of from 3 to 18 carbon atoms containing ether and thioether linkages;
R" is a hydrogen atom or a lower alkyl radical;
R''' is an alkyl radical containing 12 or more carbon atoms;
Y is a chlorine, bromine or iodine atom or other acid anion; and
$a$ having a value of 2 or 3.

As described above, X is the hydroxyl group or a hydrolyzable radical, such as alkoxy radicals, for example, methoxy, ethoxy, isopropoxy, butoxy and isobutoxy; aryloxy radicals, for example, phenoxy; halogen atoms, for example, chlorine, bromine and fluorine; acyloxy radicals, for example, acetoxy, propionoxy and decanoxy; ketoxime radicals, for example, $(CH_3)_2C=N-O-$; and amine radicals, for example, $CH_3NH-$, $NH_2-$ and $(C_2H_5)_2N-$. As used herein, "hydrolyzable group" is taken to mean any radical which will react with water at room temperature to form silanol groups. "Partial condensate" is meant to imply that a detectable amount of the hydroxyl or hydrolyzable groups remain uncondensed in the compositions used herein, preferably at least one such group for every four silicon atoms.

R is a lower alkyl radical containing no more than 6 carbon atoms, for example, methyl, ethyl and butyl.

R' is a divalent hydrocarbon radical containing from 3 to 18 carbon atoms or such a divalent hydrocarbon radical having ether and thioether linkages. Suitable divalent radicals include propylene, hexylene, phenylene, biphenylene,

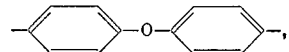

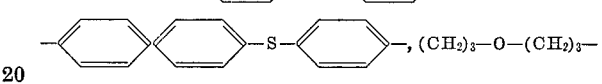

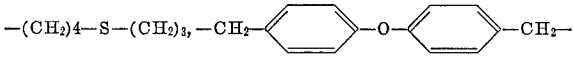

among others.

R" is the hydrogen or a lower alkyl radical, for example, methyl, ethyl, isopropyl, butyl or hexyl. The R" substituents in the organosilicon quaternary ammonium compound can be the same or different.

R''' is an alkyl radical containing 12 or more carbon atoms, such as dodecyl, tetradecyl, octadecyl, ceryl and myricyl groups. The alkyl can be normal or of branched-chain structure. The organosilicon quaternary ammonium compound must contain the relatively long chain alkyl substituent in order to be an effective lubricant. It is preferred that R''' be of 18 carbon atoms or more in order to obtain the greatest lubricity.

Y is a halogen atom; chlorine, bromine, or iodine, or other acid anion such as a carboxylate anion, a phosphate anion, a sulfate anion and the like.

The organosilicon quaternary ammonium compounds utilized in the practice of the invention can be prepared by reacting an organosilicon compound of the formula $YR'SiX_aR_{3-a}$, where Y, X, R, R' and $a$ are as defined above with an amine of the formula $R''_2R'''N$, where R" and R''' are also as defined above, in a polar solvent such as methanol, ethanol, isopropanol, acetone and the like. Other methods of preparation are shown in the examples.

Application of this organosilicon ammonium compound substantially reduces the coefficient of friction of the siliceous surface. The above-described compound can be applied by conventional techniques, such as by dipping, brushing or spraying. Regardless of the method of application, the amount of organosilicon quaternary ammonium compound is not critical. When the compound is applied from solution it is preferred that the concentration of the organosilicon quaternary ammonium compound in the solvent be in the range of 0.1 to 5 percent, preferably 0.5 to 2 percent by weight based on the weight of the solution. Suitable solvents include methanol, methylene chloride, water and acetonitrile. The choice of solvent depends upon the end use of the treated article.

The siliceous materials treated in accordance with the invention include glass articles, such as bottles, glass fibers including rovings and fabric; glass-ceramic articles such as dishes and cooking ware and porcelain articles.

The following examples are illustrative and are not to be construed as unduly limiting the invention which is set forth in the claims.

EXAMPLE 1

Three-liter, three-necked flask equipped wiht a condenser, stirer, thermometer and a Dean-Stark trap, was charged with 610 grams (2.0 moles) of octadecyldimethylamine and 440 grams (2.2 moles) of chloropropyltrimethoxysilane. To this solution, there was added 1050 grams of methyl cellosolve. The mixture was heated for 20 hours at reflux temperature during which time 201 grams of material, chiefly methanol, boiling below 118° C. was removed. This material was replaced with an equal weight of methyl Cellosolve.

After 20 hours the reaction was complete. Titration of a sample of the product,

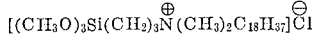

showed the chloride ion concentration to be 3.42 percent. The calculated chloride ion concentration for the product is 3.38 percent. The product was miscible with water in all proportions.

To determine the glass lubrication properties, 8-ounce glass bottles were dipped into a 0.5 percent by weight aqueous solution of the above product. The bottles were allowed to air dry. Three bottles were stacked on their sides in a pyramid on a hinged level board. The free end of the board was raised until the top bottle began to slide over the two base bottles. The angle at which sliding of the top bottle occurred was recorded as the "angle of repose." Of course, the smaller the angle of repose the greater the lubricity of the glass surface. In this manner the angle of repose for surfaces treated with

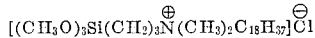

was determined to be from 3 to 4°, while untreated bottles had an angle of repose of from 24 to 28°.

EXAMPLE 2

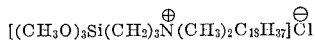

was also prepared by heating a mixture of 60 grams of octadecyldimethylamine and 40 grams of chloropropyltrimethoxysilane in a stainless steel autoclave. The reactants were maintained at 100° C. in the autoclave. After about 70 hours, 89.5 grams of an orange liquid product was obtained. Titration for the chloride ion indicated that the reaction was 72 percent complete. The product was soluble in water.

The glass lubricating properties of the product were determined by the test procedure described in Example 1. The treated glass bottles had an angle of repose of 4°, showing the product to be an excellent lubricant for glass surfaces.

EXAMPLE 3

A solution of 121 grams (0.55 mole) of dodecyldimethylamine and 99 grams (0.5 mole) of chloropropyltrimethoxysilane was heated to 120–125° C. for a period of about 20 hours. After 20 hours, titration for the chloride ion showed the reaction to be about 93 percent complete. The reaction product,

[(CH₃O)₃Si(CH₂)₃N⁺(CH₃)₂(C₁₂H₂₅)]Cl⁻ was soluble in water.

A 0.5 weight percent aqueous solution of the product was tested in the same manner as in Example 1. The angle of repose was determined to be 5°. After immersion in boiling water for one hour, the treated bottles were again tested, the angle of repose was 7°.

EXAMPLE 4

A mixture of 80 grams (0.4 mole) of dodecylamine and 40 grams (0.2 mole) of chloropropyltrimethoxysilane was heated for 24 hours at 110–130° C. Analysis for the chloride ion showed the reaction to be 99 percent complete.

One mole (60 grams) of ethylenediamine was added to the product. This slurry was stirred for several hours. After separation, the upper layer (117 grams) was devolatilized at 60° C./1 mm. Hg to obtain 91 grams of non-volatile product. This product was not soluble in water but the material was soluble as the acid salt,

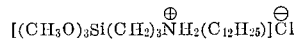

in acidified (HCl) water.

The product was used to treat glass bottles in the manner described in Example 1. The angle of repose was determined to be 12°.

EXAMPLE 5

A mixture of 81.6 grams of coco-amine (molecular weight of approximately 204) and 40 grams of chloropropyltrimethoxysilane was treated for 22 hours at 120° C. The chloride ion concentration indicated that the reaction was complete after this period. One mole (60 grams) of ethylenediamine was stirred into the reaction mixture. After separation, the upper layer was devolatilized at 75° C./0.5 mm. Hg to yield 97.7 grams of liquid. The product,

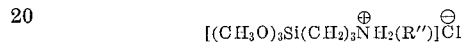

where R″ is the coco radical, was not soluble in neutral water, but was soluble as the hydrochloride salt.

A 0.5 weight percent aqueous solution of the soluble salt was used as a lubricant on glass bottles and tested in the manner set forth in Example 1. The angle of repose was 6°.

After the initial testing, the bottles were immersed in boiling water for one hour. After air drying the bottles were again tested to determine the lubricity of the glass; the angle of repose remained unchanged. Thus, the lubrication effect on dishes and cookware would be retained through a number of washing cycles.

EXAMPLE 6

When rovings of glass fiber are passed through a bath consisting of a 1.0 percent aqueous solution of

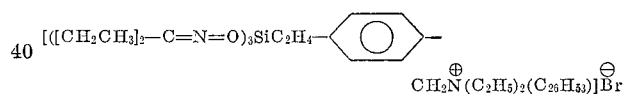

the treated glass is easier to handle during processing and has a lower incidence of breakage than untreated glass.

EXAMPLE 7

The product of Example 1 can be added to the rinse cycle of a commercial dishwasher to give an aqueous solution of

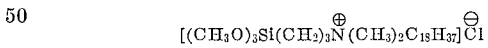

in the rinse water. This rinse water can also contain commercially available non ionic surfactants to aid in air drying of washed dishes. Thus glass and glass-ceramicware can be lubricated in conjunction with the washing of the articles and existing apparatus can be easily used.

A sample of a 2% aqueous solution of the product of Example 1 containing an equal volume of a commercially available non ionic surfactant was prepared to simulate the water used in a rinse cycle. The solution was tested on bowls made from Pyroceram (a trademark of Corning Glass Works for a glass-ceramic material) to determine its lubricating properties. It was an excellent lubricant for such material.

The sample was then stored for 8 weeks and again tested. The lubricity imparted by the solution was the same. The aqueous solution showed no signs of deterioration after the 8 week period.

EXAMPLE 8

A solution of 165 grams (0.55 mole) of octadecyldimethylamine and 92 grams (0.5 mole) of (CH₃)₂CH₂Si(CH₂)₃Cl in 257 grams of methyl Cellosolve was heated at 110–125°

C. for 22 hours. A chloride analysis of the product indicated that the reaction was complete. The product,

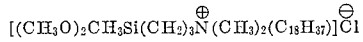

was soluble in water.

A 0.5 weight percent aqueous solution of the product was tested in the manner described in Example 1. The initial angle of repose was 6°. After 1 hour immersion in boiling water, the bottles had an angle of repose of 8°.

EXAMPLE 9

A solution of 24.7 grams (0.1 mole) of α-chlorotolyltrimethoxysilane and 29.8 grams (0.1 mole) of octadecyldimethylamine was refluxed together with 54.5 grams of isopropanol at 86° C. for 6.5 hours. Titration for the chloride ion showed that the reaction was 97% complete. The product,

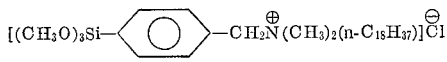

was soluble in water.

As 0.5 weight percent aqueous solution of the product was tested as described in previous examples. The angle of repose was 6°.

EXAMPLE 10

Equimolar amounts of α-chlorotolyltrimethoxysilane and hexadecyldimethylamine were refluxed together with isopropanol for 6.5 hours. Titration for the chloride ion showed the reaction to 93% complete.

A 0.5 weight percent aqueous solution of the product,

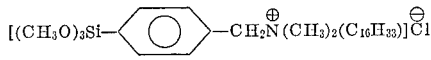

was tested as a glass lubricant. The angle of repose was 5°.

These examples demonstrate the improved lubricity imparted to siliceous surfaces by the practice of the invention. Reasonable modification and variation are within the scope of the invention.

That which is claimed is:

1. A method of lubricating the surface of an inorganic solid siliceous material comprising applying to said surface an organosilicon quaternary ammonium compound of the general formula

in which

X is the hydroxyl group or a hydrolyzable group;
R is a lower alkyl radical;
R' is a divalent hydrocarbon radical containing from 3 to 18 carbon atoms;
R'' is the hydrogen atom or a lower alkyl radical;
R''' is an alkyl group containing 12 or more carbon atoms;
Y is an acid anion selected from the group consisting of halide, carboxylate, phosphate and sulfite anions.
$a$ is 2 or 3.

2. The method of claim 1 wherein said organosilicon quaternary ammonium compound is

3. The method of claim 1 wherein said organosilicon compound is applied by immersing said siliceous material in an aqueous solution of the organosilicon quaternary ammonium compound.

4. The method of claim 1 in which X is the organosilicon quaternary ammonium compound is a halide anion.

5. The method of claim 4 wherein X is a chloride atom.

6. The method of claim 1 wherein the siliceous material is glass.

7. The method of claim 1 wherein the siliceous material is a glass ceramic material.

References Cited

UNITED STATES PATENTS 3,402,191  9/1968  Morehouse _____ 260—448.2
3,471,541  10/1969  Morehouse _____ 260—448.2X DANIEL WYMAN, Primary Examiner
W. H. CANNON, Assistant Examiner